(12) United States Patent
Amakawa

(10) Patent No.: US 7,081,633 B2
(45) Date of Patent: Jul. 25, 2006

(54) APPARATUS, METHOD AND PROGRAM FOR ION IMPLANTATION SIMULATION, AND COMPUTER READABLE STORAGE MEDIUM HAVING STORED THEREIN THE PROGRAM

(75) Inventor: Hirotaka Amakawa, Ibaraki-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/043,113

(22) Filed: Jan. 27, 2005

(65) Prior Publication Data

US 2005/0184255 A1    Aug. 25, 2005

(30) Foreign Application Priority Data

Jan. 30, 2004    (JP)    ............................. 2004-022647

(51) Int. Cl.
*H01L 21/00*    (2006.01)

(52) U.S. Cl. ............................. 250/492.21; 250/492.2; 250/492.3

(58) Field of Classification Search .................... None
See application file for complete search history.

(56) References Cited

U.S. PATENT DOCUMENTS 6,878,595 B1* 4/2005 Spratt ......................... 438/288
2002/0087298 A1* 7/2002 Ito et al. ........................ 703/14
2004/0002202 A1* 1/2004 Horsky et al. .............. 438/515

FOREIGN PATENT DOCUMENTS

JP    2000-340518    12/2000

\* cited by examiner

*Primary Examiner*—Nikita Wells
*Assistant Examiner*—Anthony Quash
(74) *Attorney, Agent, or Firm*—Oblon, Spivak, McClelland, Maier & Neustadt, P.C.

(57) ABSTRACT

An ion implantation simulator that computes an ion density distribution at high speed and with high accuracy based on a beam dispersion phenomenon in an ion implantation process. The ion implantation simulator is provided with the beam dispersion approximate function storage section 121, which stores a beam dispersion approximate function that is obtained through approximation of ion beam dispersion by using a predetermined function; a beam intensity computing section 131, which computes an area surface beam intensity that indicates an intensity of the ion beam on a surface of an implanted area by using the beam dispersion approximate function; and an ion density distribution computing section 132, which computes the density distribution of the ion, which is implanted by the ion beam into the device through the surface of the implanted area, by using the area surface beam intensity.

6 Claims, 12 Drawing Sheets

$$C(x_0, y_0) = \int DV(r_p) H(r_l) dx \quad \text{(FORMULA 2)}$$

CONVENTIONAL DIRECT ANGULAR INTEGRATION (DOUBLE INTEGRAL)

$$C(x_0, y_0) = \iint DV(r_p) H(r_l) G(\theta) dx d\theta \quad \text{(FORMULA 3)}$$

$$G(\theta) = \frac{1}{\sqrt{2\pi\sigma_\theta^2}} \exp[-(\theta - \theta_0)^2 / 2\sigma_\theta^2] \quad \text{(FORMULA 4)}$$

$\theta_0$ IMPLANTATION ANGLE $\sigma_\theta$ ANGLE VARIANCE

APPARATUS, METHOD AND PROGRAM FOR ION IMPLANTATION SIMULATION, AND COMPUTER READABLE STORAGE MEDIUM HAVING STORED THEREIN THE PROGRAM

BACKGROUND OF THE INVENTION

1. Field of the Invention

The present invention relates to a process simulation of ion implantation that is used in the semiconductor device manufacturing process. More particularly, the present invention relates, for example, to the simulation of an ion density distribution in an ion implantation process.

2. Description of the Related Art

The process simulation of ion implantation is classified broadly into the Monte Carlo method and the distribution function method. The distribution function method, also called analytic method, approximates an ion distribution by an analytic function. With the distribution function method, there is a high demand for conflicting requirements of shorter computing time and accuracy improvement. This demand has been answered, for example, by a conventional technique disclosed in Japanese Patent Unexamined Publication No. 2000-340518 (Patent Literature 1) of a semiconductor process simulation method outlined below. The semiconductor process simulation method is directed to a simulation based on the discrete computation of the impurity density of a semiconductor device structure. The semiconductor process simulation method is characterized by presetting the position of a grid required for the discreet computation based on simulation procedure data. The grid position presetting method includes adding more grids, in addition to an initial grid, at the position of a maximum value of the impurity distribution function by an ion implantation. Still, more grids are added further until the ion implantation simulation reaches an error range desired.

With the accuracy improvement of the ion implantation simulation based on a distribution function method, beam dispersion of an ion beam implanted has become an indispensable consideration. More specifically, if a semiconductor device is miniaturized, then the temperature of the thermal process will become low, the time will become shorter, so that the distribution of impurity implanted through ion implantation into a device is inhibited. This means that it is the impurity distribution adopted in the ion implantation process that controls the device characteristics. For this reason, in addition to the effects on the device characteristics of the energy and the implantation angle that characterize the density distribution of impurity within a device through ion implantation, the effects on the device characteristics of the angular distribution of an ion beam implanted (also called ion beam dispersion or beam dispersion), which had received little attention, have also become noticeable.

In addition, if a semiconductor device is miniaturized and consequently the implantation energy is lowered, then the self-reaction of an ion becomes noticeable, and the beam dispersion itself has become large. If beam dispersion occurs in a field-effect transistor, for example, then the amount of ion that is implanted into a silicon substrate is reduced by the effects of a "shadow" caused by a gate electrode. This may lead to a reduction in driving force for the transistor. Therefore, the ion implantation simulation requires a highly accurate computation of the effects of the "shadow" caused by the gate electrode so that such a phenomenon can be predicted.

Conventional ion implantation simulators that use the distribution function, however, have no function to perform a directly execution of a simulation involving beam dispersion. If a simulation involving the beam dispersion is performed by an angular integration of an implantation angle based on a conventional simulation method, then the computing time will increase, which is a problem. The problem of increased computing time is vital in three-dimensional simulation. A brief description of those problems will be given below.

FIG. 13 is a diagram illustrating a conventional computation of ion implantation with no consideration of the beam dispersion. To ensure precision in computation near a device edge of a device area, extended areas as areas to be used for the computation of ion implantation are set so as to extend the device area on both sides. With the conventional computation of ion implantation with no consideration of beam dispersion, a computation area will hereinafter be referred to as an extended device area, if not otherwise specified. With the conventional computation of ion implantation with no consideration of beam dispersion, a formula 1 shown in FIG. 14, for example, is used as the distribution function of an ion. With reference to the formula, $V(r_p)$ denotes a vertical distribution function, e.g., Pearson function; $H(r_t)$ denotes a horizontal distribution function, e.g., a Gauss function; and D denotes a doze amount. FIG. 15 is a diagram illustrating the case where the device of the diagram of FIG. 14 receives ion beams implanted. The ion density at an arbitrary point C (xo, yo) in an area 2 is obtained by a formula 2 shown in FIG. 15. In other words, an ion implantation distribution can be obtained by integrating the distribution function in the horizontal direction (towards the x direction).

A description will now be given, with reference to FIG. 16, of the computation method of ion implantation that involves the beam dispersion by an angular integration of the implantation angle based on the conventional simulation method. According to this method, ion density at the arbitrary point C (xo, yo) in the area 2 is obtained by a direct angular integration (Double Integral) base on a formula 3 shown in FIG. 16. With reference to the formula 3, $G(\theta)$ denotes the beam dispersion, which is approximated by the Gauss function of a formula 4, $\theta_0$ denotes the implantation angle, and $\sigma_0$ denotes the angular distribution.

[Patent Literature 1] Unexamined Patent Publication No. 2000-340518.

SUMMARY OF THE INVENTION

It is an object of the present invention to provide an apparatus and method for ion implantation simulation that involves beam dispersion phenomenon in an ion implantation process, which will impose serious effects on the characteristics of a leading edge semiconductor device, and computes an ion density distribution at high speed and with high accuracy.

These and other objects of the embodiments of the present invention are accomplished by the present invention as hereinafter described in further detail.

According to one aspect of the present invention, an ion implantation simulation apparatus implants an ion by an ion beam into a device through a surface of a predetermined area of the device, and simulates a density distribution of the ion in the device. Then, the ion implantation simulation apparatus may include, a beam dispersion approximate function storage section that stores beam dispersion approximate function that is obtained through approximation of ion beam dispersion that indicates a divergence of the ion beam by using a predetermined function;

a beam intensity computing section that computes an area surface beam intensity that indicates an intensity of the ion beam on a surface of an implanted area that indicates the surface of the predetermined area into which the ion is implanted by the ion beam by using the beam dispersion approximate function that is stored in the beam dispersion approximate function storage section; and an ion density distribution computing section that computes the density distribution of the ion, which is implanted by the ion beam into the device through the surface of the implanted area, by using the area surface beam intensity that is computed by the beam intensity computing section.

The beam dispersion approximate function storage section stores the beam dispersion approximate function that is obtained through approximation of the ion beam dispersion by using a Gauss distribution function as the predetermined function.

The beam intensity computing section computes the area surface beam intensity by using an angular integration.

According to another aspect of the present invention, a method for ion implantation simulation is a method for implanting an ion by an ion beam into a device through a surface of a predetermined area of the device, and simulating a density distribution of the ion in the device. The method for ion implantation simulation may include:

storing a beam dispersion approximate function that is obtained through approximation of ion beam dispersion that indicates a divergence of the ion beam by using a predetermined function;

computing an area surface beam intensity that indicates an intensity of the ion beam on a surface of an implanted area that indicates the surface of the predetermined area into which the ion is implanted by the ion beam based on the beam dispersion approximate function that is stored in the beam dispersion approximate function storage section; and computing the density distribution of the ion, which is implanted by the ion beam into the device through the surface of the implanted area, by using the area surface beam intensity that is computed by the beam intensity computing section.

According to still another aspect of the present invention, a program for ion implantation simulation causes a computer to execute the processes of implanting an ion by an ion beam into a device through a surface of a predetermined area of the device, and simulating a density distribution of the ion in the device. The program may includes the processes of:

storing a beam dispersion approximate function that is obtained through approximation of ion beam dispersion that indicates a divergence of the ion beam by using a predetermined function;

computing an area surface beam intensity that indicates an intensity of the ion beam on a surface of an implanted area that indicates the surface of the predetermined area into which the ion is implanted by the ion beam based on the beam dispersion approximate function that is stored in the beam dispersion approximate function storage section; and computing the density distribution of the ion, which is implanted by the ion beam into the device through the surface of the implanted area, by using the area surface beam intensity that is computed by the beam intensity computing section.

According to still another aspect of the present invention, a computer readable storage medium has a program for ion implantation simulation, wherein the program causes a computer to execute the processes of implanting an ion by an ion beam into a device through a surface of a predetermined area of the device, and simulating a density distribution of the ion in the device. The program may includes the processes of:

storing a beam dispersion approximate function that is obtained through approximation of ion beam dispersion that indicates a divergence of the ion beam by using a predetermined function;

computing an area surface beam intensity that indicates an intensity of the ion beam on a surface of an implanted area that indicates the surface of the predetermined area into which the ion is implanted by the ion beam based on the beam dispersion approximate function that is stored in the beam dispersion approximate function storage section; and computing the density distribution of the ion, which is implanted by the ion beam into the device through the surface of the implanted area, by using the area surface beam intensity that is computed by the beam intensity computing section.

The present invention allows computing an ion density distribution with consideration of the effects of beam dispersion at high speed and with high accuracy.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

Figure 11:
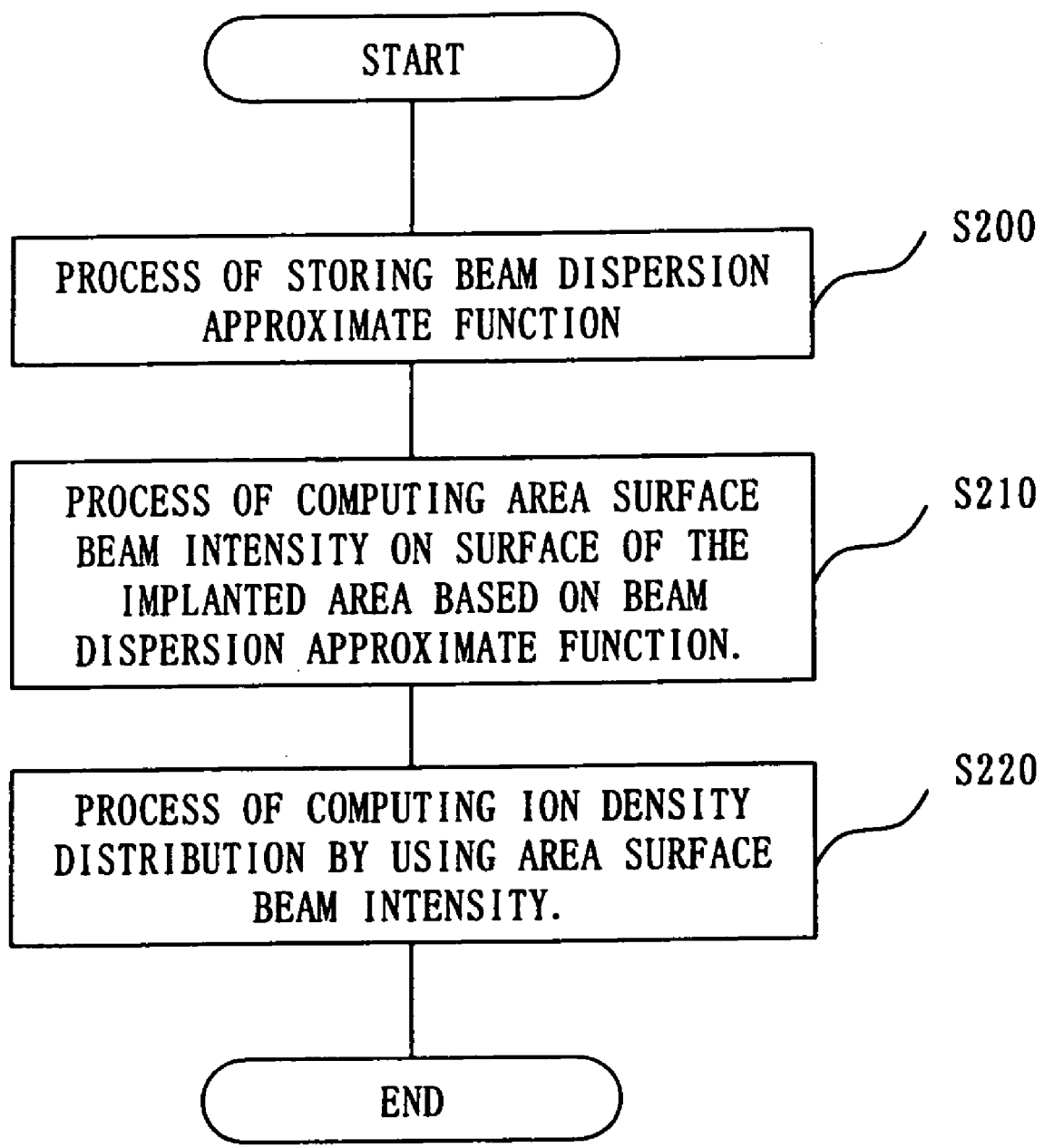
Figure 12:
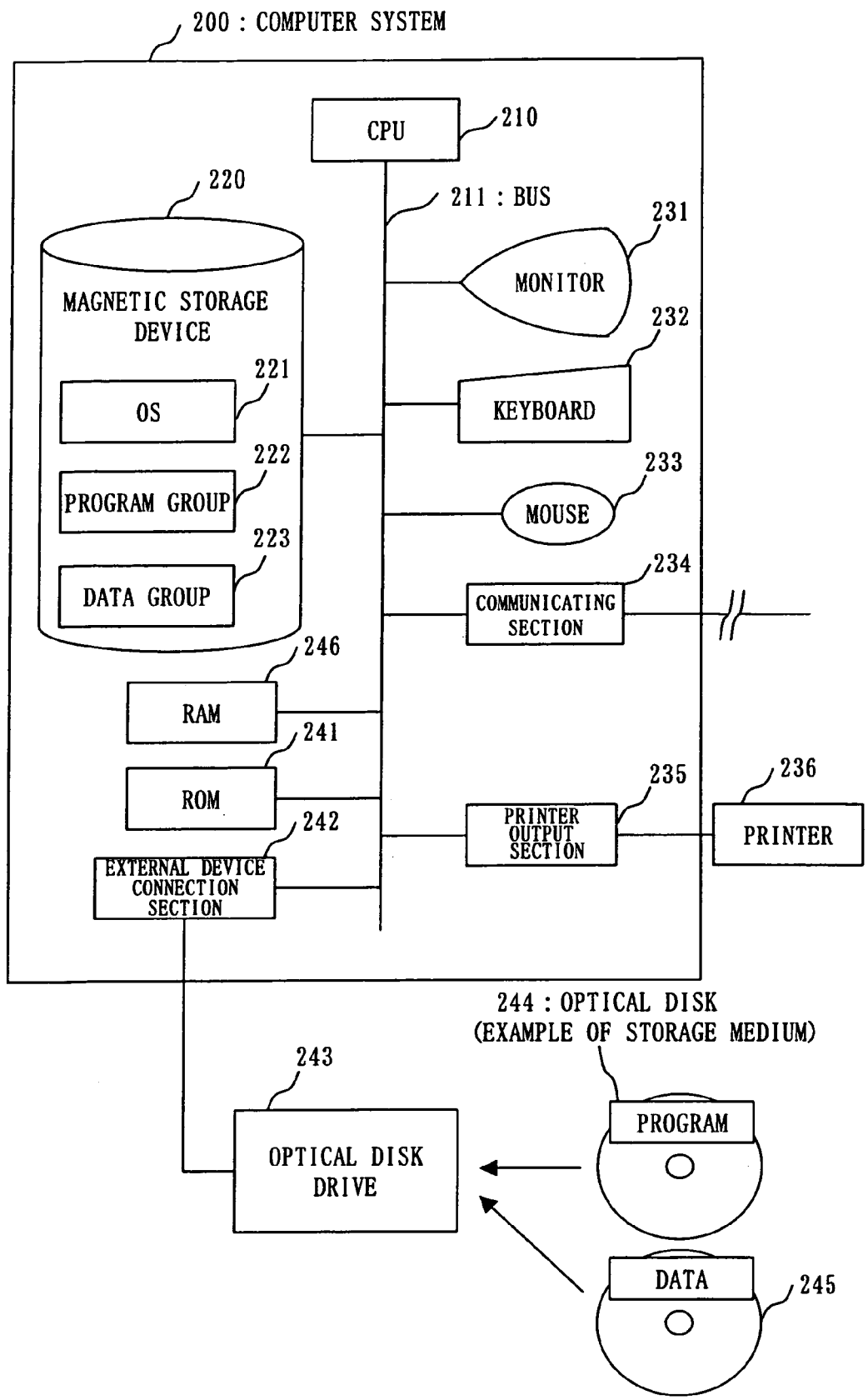
Figure 13:
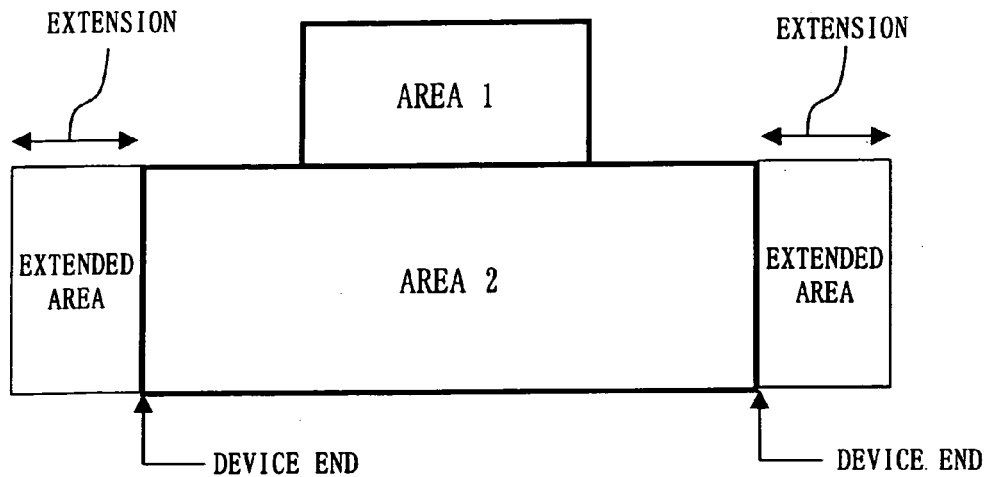
Figure 14:
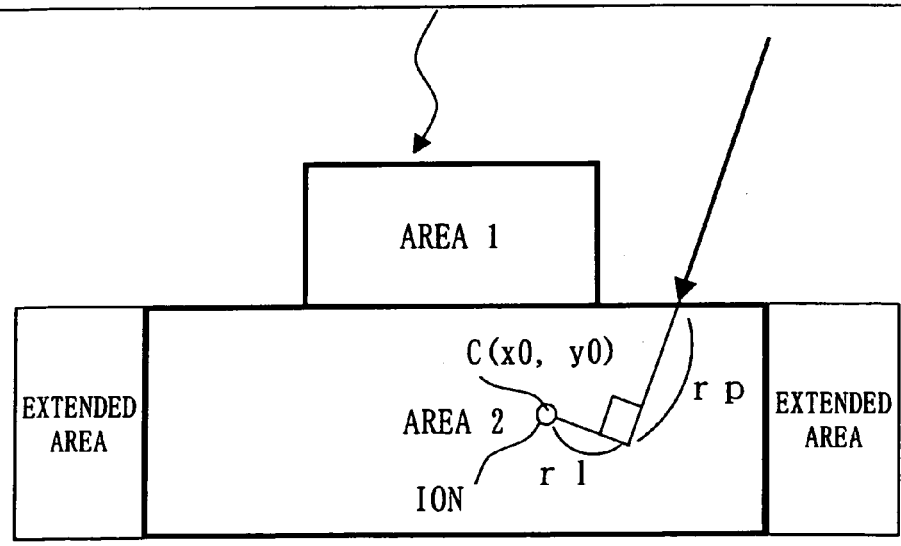
Figure 15:
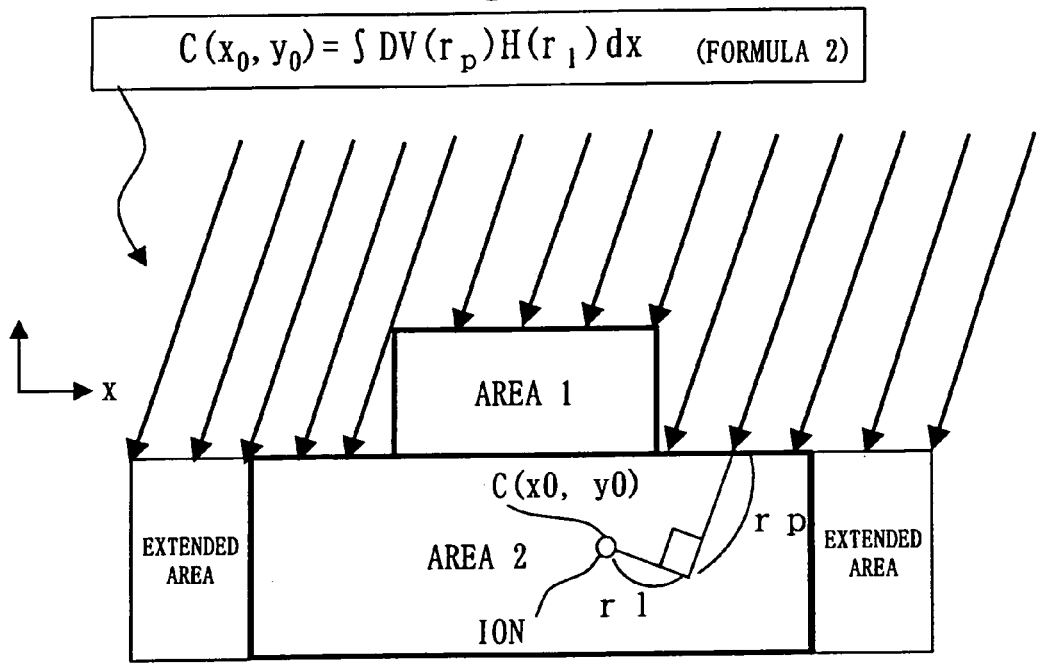
Figure 16:
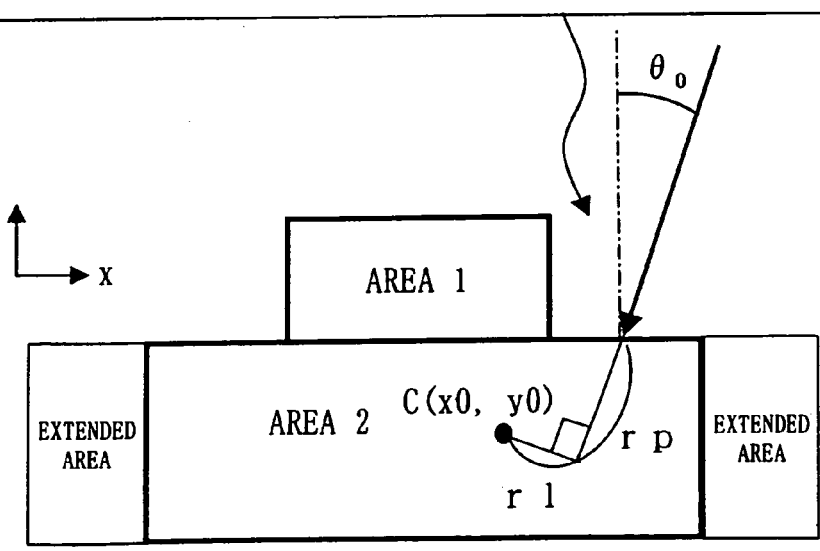

FIG. 11 is a flow chart illustrating an embodiment of a method according to a second embodiment regarding the operations of the beam dispersion approximate function storage section 121, the beam intensity computing section 131, and the ion density distribution computing sanction 132 of the ion implantation simulator 100 as a series of the operations;

FIG. 12 is a diagram illustrating a configuration of a computer system 200 according to the second embodiment;

FIG. 13 is a diagram illustrating an extended area with disregard to conventional beam dispersion;

FIG. 14 is a diagram illustrating the computation of ion implantation with disregard to the conventional beam dispersion;

FIG. 15 is a diagram illustrating the case of ion implantation with disregard to the conventional beam dispersion; and FIG. 16 is a diagram illustrating a computation of a double integral using an angular integration with consideration of the conventional beam dispersion.

DETAILED DESCRIPTION OF THE PREFERRED EMBODIMENTS

Reference will now be made in detail to the present preferred embodiments of the invention, examples of which are illustrated in the accompanying drawings, wherein like reference numerals indicate like devices through out the several views.

Embodiment 1

A first embodiment of the present invention is an embodiment of an ion implantation simulator 100 that computes an ion implantation simulation involving the phenomenon of beam dispersion in an ion implantation process at high speed. The ion implantation simulator 100 indicates the phenomenon of beam dispersion in the ion implantation process as beam intensity on a surface of an implanted area, and performs the computation of the ion implantation by using the beam intensity. The "beam dispersion" and the "surface of the implanted area" will hereinafter be described in detail.

Figure 1:
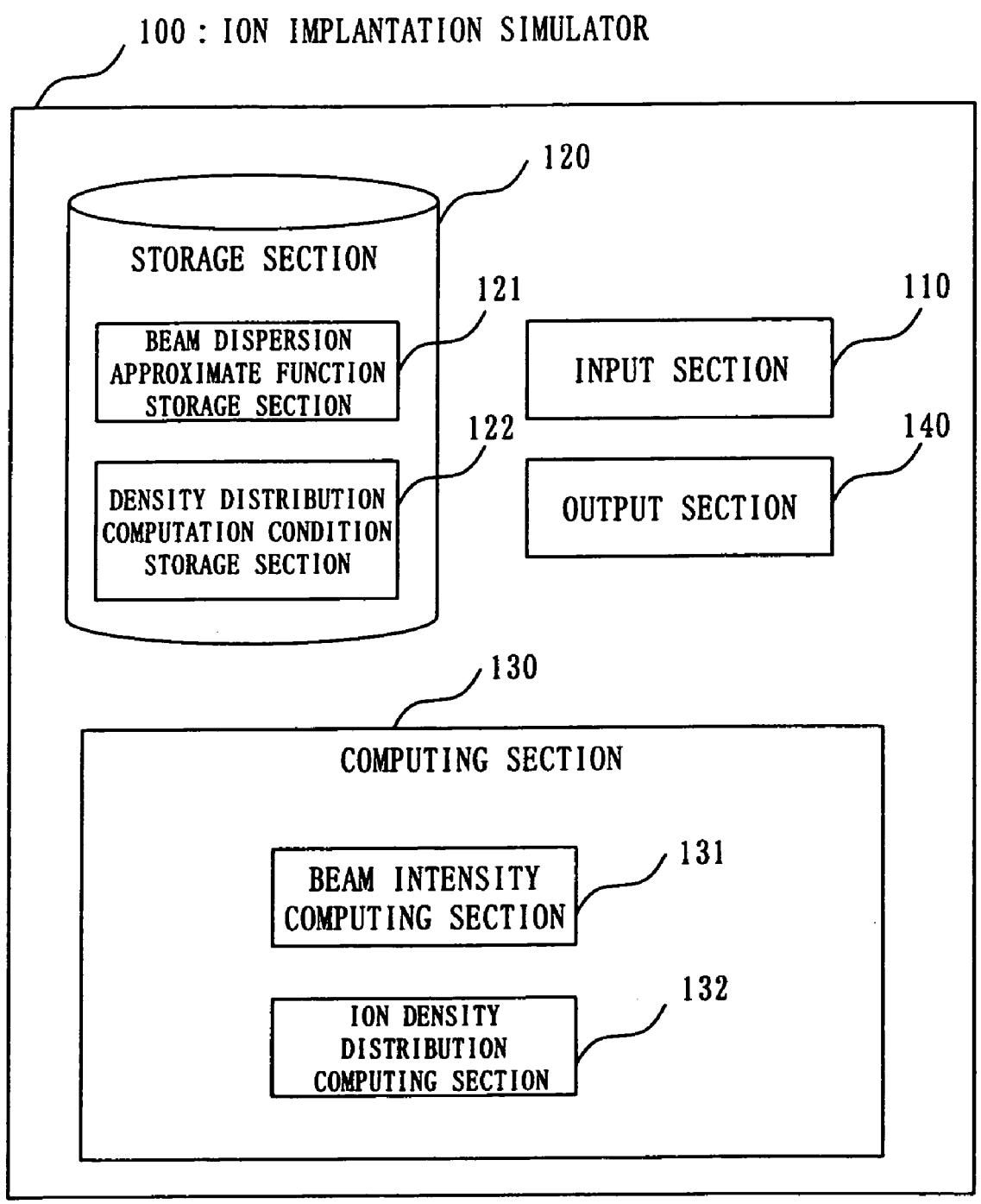
FIG. 1 is a diagram illustrating a configuration of an ion implantation simulator 100 according to a first embodiment.

FIG. 1 is a block diagram of the ion implantation simulator 100. A configuration of the ion implantation simulator 100 will be discussed with reference to FIG. 1. The ion implantation simulator 100 includes an input section 110 that inputs data that is required for simulation, a storage section 120 that stores data inputted, a computing section 130 that reads and computes data from the storage section 120, and an output section 140 that outputs a computation result from the computing section 130 and data inputted to the input section 110.

The storage section 120 also stores a beam dispersion approximate function storage section 121 that stores a beam dispersion approximate function, which will hereinafter be discussed, and a density distribution computation condition storage section 122 that stores computation conditions that are used for the computation of a density distribution.

The computing section 130 includes a beam intensity computing section 131 that computes the beam intensity, and an ion density distribution computing section 132 that computes an ion density distribution by use of the beam intensity that is computed by the beam intensity computing section 131.

The input section 110 is configured with such as a keyboard, a mouse, and a flexible disk, which are not shown in the figure, for example.

The storage section 120 and the computing section 130 are each configured by a computer system that includes a Central Processing Unit (CPU), not shown in the figure, and storage devices connected to the CPU such as a Read Only Memory (ROM), a Random Access Memory (RAM), and a magnetic disk drive, not shown in the figure, for example.

The output section 140 is configured by such as a display and a printer, not shown in the figure.

Figure 2:
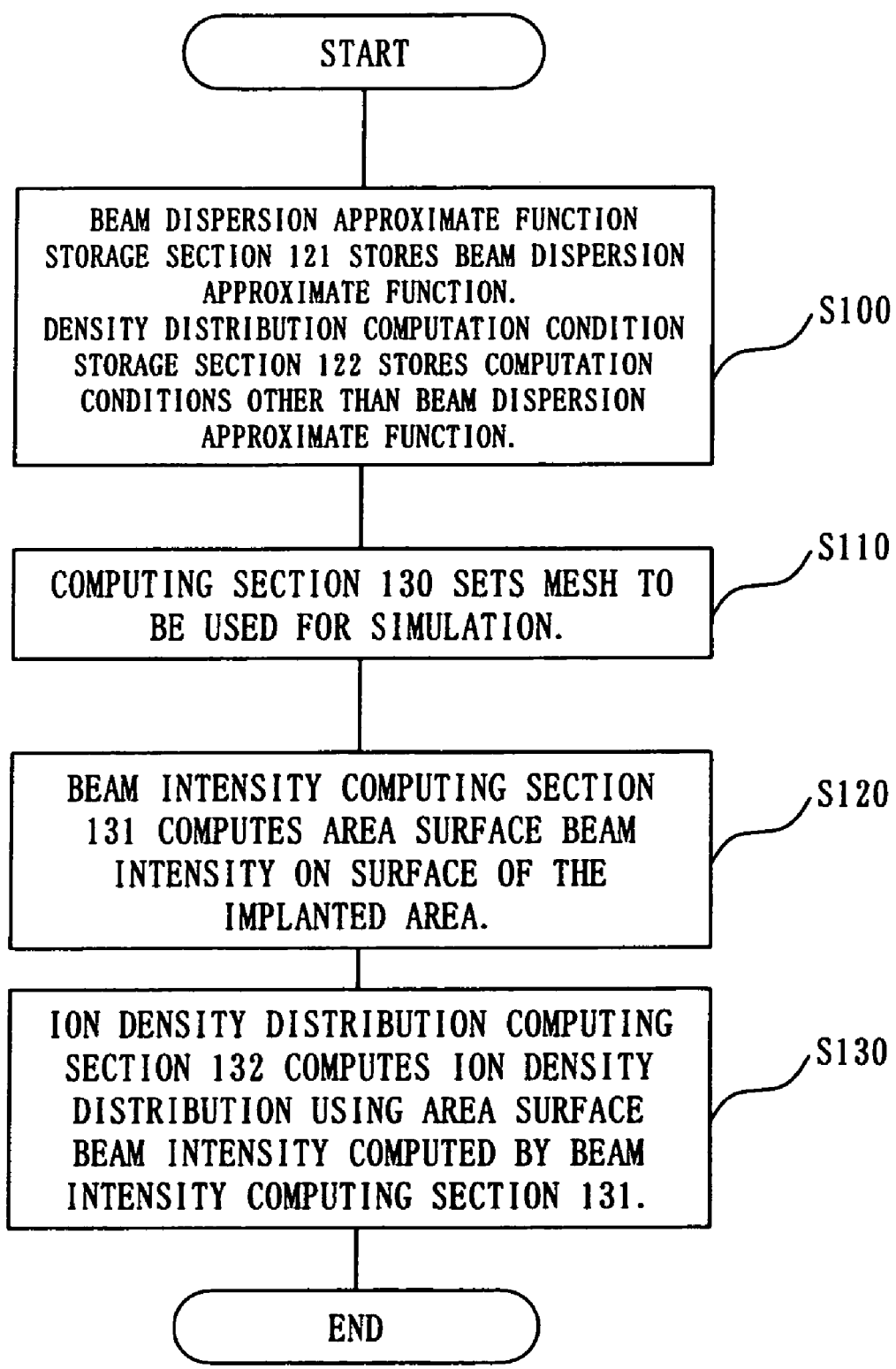
FIG. 2 is a flow chart illustrating a process in which the ion implantation simulator 100 stores a beam dispersion approximate function and other computation conditions, and then computes an ion density distribution according to the first embodiment.

A description will now be given of an operation of the ion implantation simulator 100. FIG. 2 is a flow chart illustrating a process in which the ion implantation simulator 100 stores the beam dispersion approximate function and other computation conditions, and then computes the ion density distribution. An operation of the ion implantation simulator 100 follows with reference to FIG. 2.

Figure 3:
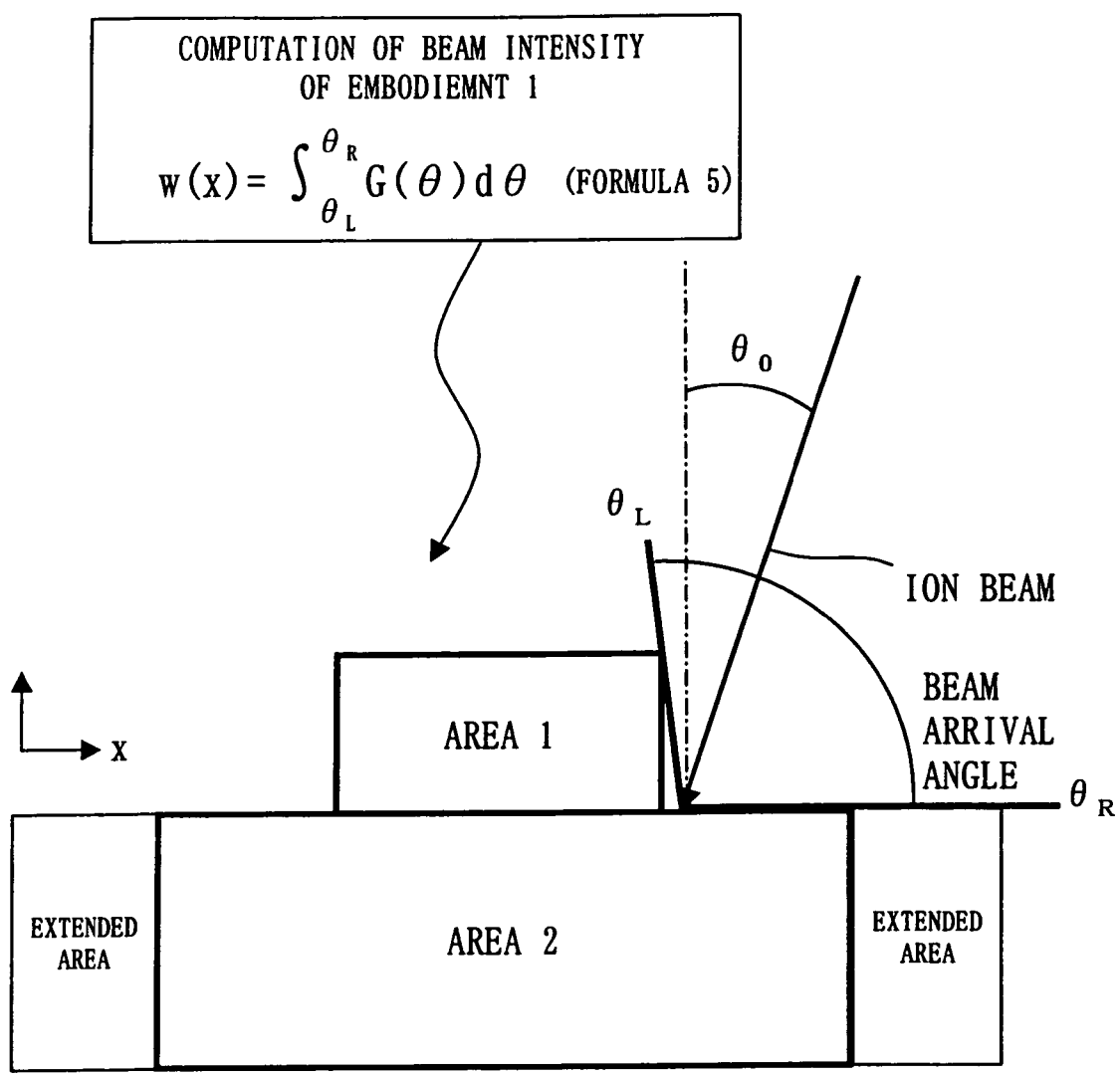
FIG. 3 is a diagram illustrating a computation of beam intensity according to the first embodiment.
Figure 4:
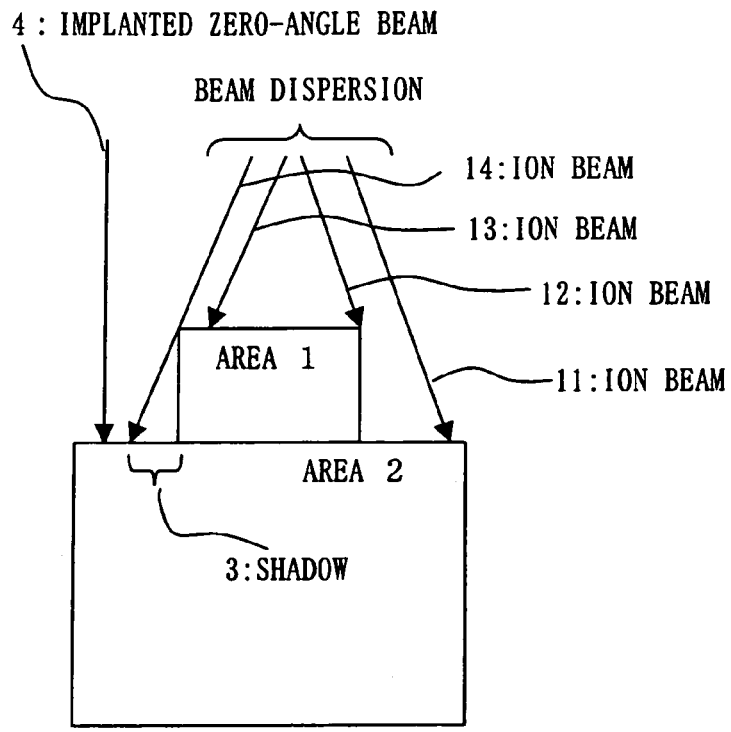
FIG. 4 is a diagram illustrating beam dispersion according to the first embodiment.

In S100, the beam dispersion approximate function storage section 121 stores the beam dispersion approximate function, which will hereinafter be described in detail. The density distribution computation condition storage section 122 stores the computation conditions other than the beam dispersion approximate function. The beam dispersion approximate function to be stored in the beam dispersion approximate function storage section 121 is inputted through the input section 110. It is to be noted here that the "beam dispersion approximate function" is obtained by approximating the ion beam dispersion by a given function. FIG. 3 is a diagram illustrating the computation of beam intensity w(x) by the angular integration of the beam dispersion approximate function. With reference to a formula 5 shown in the figure, $G(\theta)$ denotes the beam dispersion approximate function, which is the Gauss function like $G(\theta)$ of FIG. 16. The "ion beam dispersion" is an ion beam divergence, which means the angular distribution of an ion beam to be implanted, as discussed with reference to the conventional art. A further description will be given of the "ion beam dispersion" with reference to FIG. 4. The "ion beam dispersion" is the phenomenon that an ion beam 11, an ion beam 12, etc. are injected with a divergence into surfaces of the implanted area, respectively, as shown in FIG. 4. It is to be noted here that the "surface of the implanted area" is the surface of a device into which an ion is implanted by an ion beam. Even with a beam that is implanted into the surface of the implanted area at an implantation angle of zero degrees like an implantation zero-angle beam 4, if an implantation energy is low, for example, then the self-reaction of the ion will become noticeable. This causes the beam to diverge, so that the beam is not implanted in a perpendicular manner but implanted with a divergence into the surface of the implanted area like the ion beam 11 through an ion beam 14. The "ion beam dispersion" can thus be described. With reference to FIG. 4, if ion beam dispersion occurs, the ion beams are blocked by an area 1, which creates a "shadow 3" on the surface. Accordingly, the ion beams cannot reach the surface easily in the "shadow 3", so that the amount of ion to be implanted becomes low in the "shadow 3". The ion implantation simulator 100 of the first embodiment is allowed to perform a highly accurate computation with consideration of the effects of the "shadow 3" by indicating the beam dispersion by the beam intensity. More specifically, the beam dispersion approximate function storage section 121 is assumed to store a beam dispersion approximate function that is obtained through approximation by a Gauss distribution function, which defines that the angle of the ion beam dispersion should be three degrees.

Figure 5:
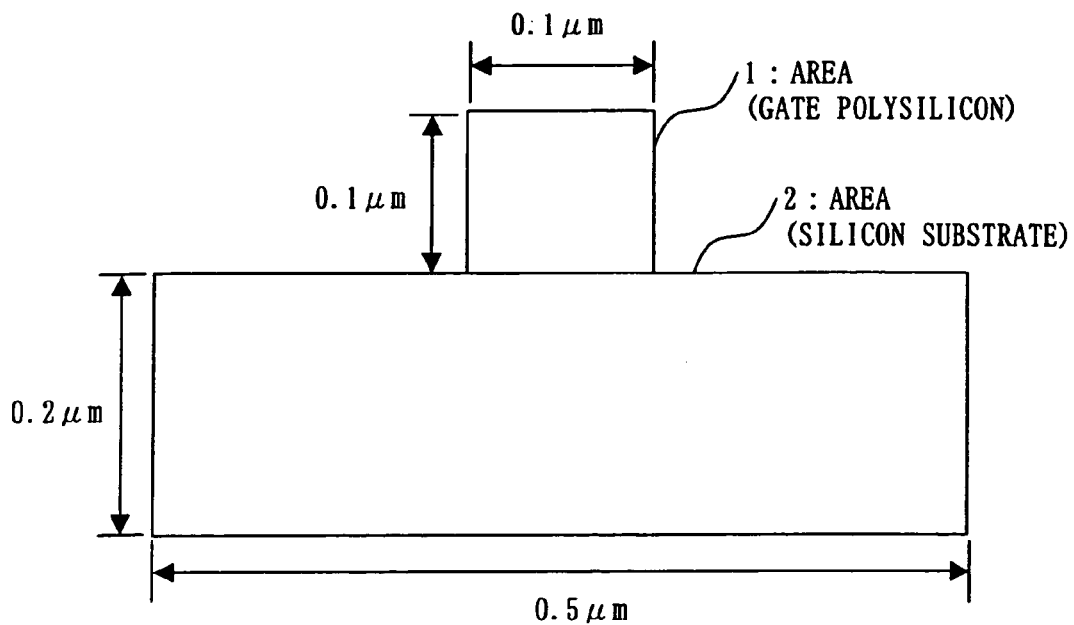
FIG. 5 is a schematic diagram illustrating a two-dimensional device structure of a field-effect transistor according to the first embodiment.

The implantation angle is assumed to be zero degrees. By use of an ion beam having the ion beam dispersion thus characterized, an ion is implanted into a device structure shown in FIG. 5. FIG. 5 is a schematic diagram illustrating a two-dimensional device structure of a field-effect transistor. The density distribution computation condition storage section 122 stores the device structure of FIG. 5 as one of the computation conditions. A gate insulator is not shown for the sake of simplicity of explanation. An area 1 corresponds to a Gate polysilicon. An area 2 corresponds to a silicon substrate. The Gate polysilicon is 0.1 μm in width and 0.1 μm in height. The silicon substrate is 0.5 μm in width and 0.2 μm in height. The density distribution computation condition storage section 122 also stores the density distribution of an ion to be implanted as a Gauss distribution. In addition, the density distribution computation condition storage section 122 stores a range as $100 \times 10^{-10}$ (m), a perpendicular variance as $50 \times 10^{-10}$(m), and a horizontal variance as $25 \times 10^{-10}$(m) for each of the areas 1 and 2.

Figure 6:
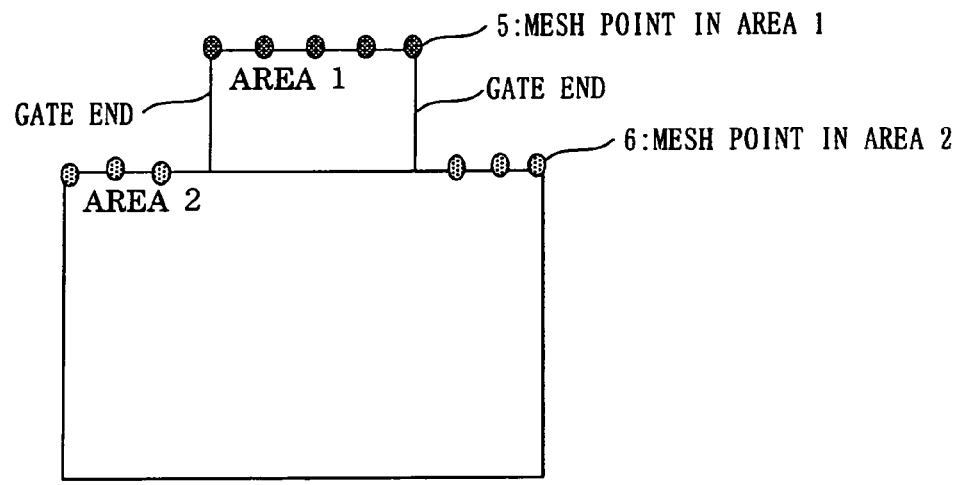
FIG. 6 is a conceptual diagram illustrating a case of generating a mesh point 5 in the area 1 and a mesh point 6 in the area 2 by the computing section 130 according to the first embodiment.

In S110, the computing section 130 reads the device structure of FIG. 5 and mesh generation conditions, which are stored in the density distribution computation condition storage section 122, and generates a mesh to be used for simulation. The mesh to be used for simulation is assumed to be $25 \times 10^{-10}$(m) in the horizontal direction and $50 \times 10^{10}$ (m) in the vertical direction. FIG. 6 is a conceptual diagram illustrating a mesh point 5 in the area 1 and a mesh point 6 in the area 2 that are generated by the computing section 130. The figure shows mesh points on the surface of the device for the sake of the illustration of the computation of the beam intensity on the surface of the device. Thus, as shown in the figure, there is no mesh point generated in a portion of the area 2 that is covered by the area 1.

Figure 7:
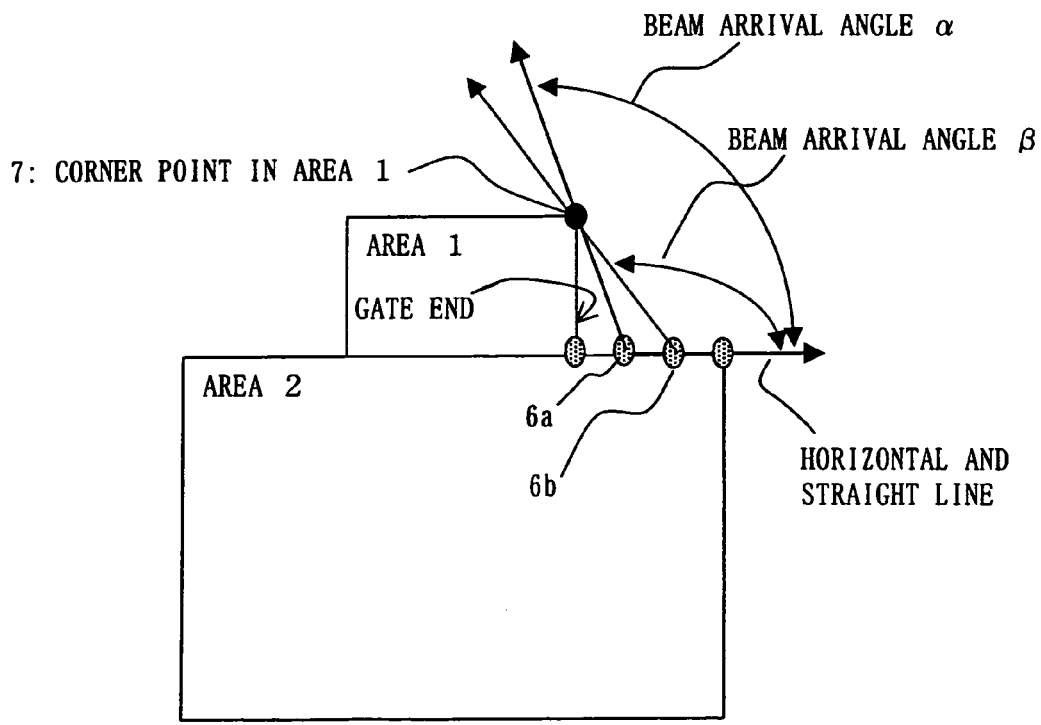
FIG. 7 is a schematic diagram illustrating an expected beam angle according to the first embodiment.
Figure 8:
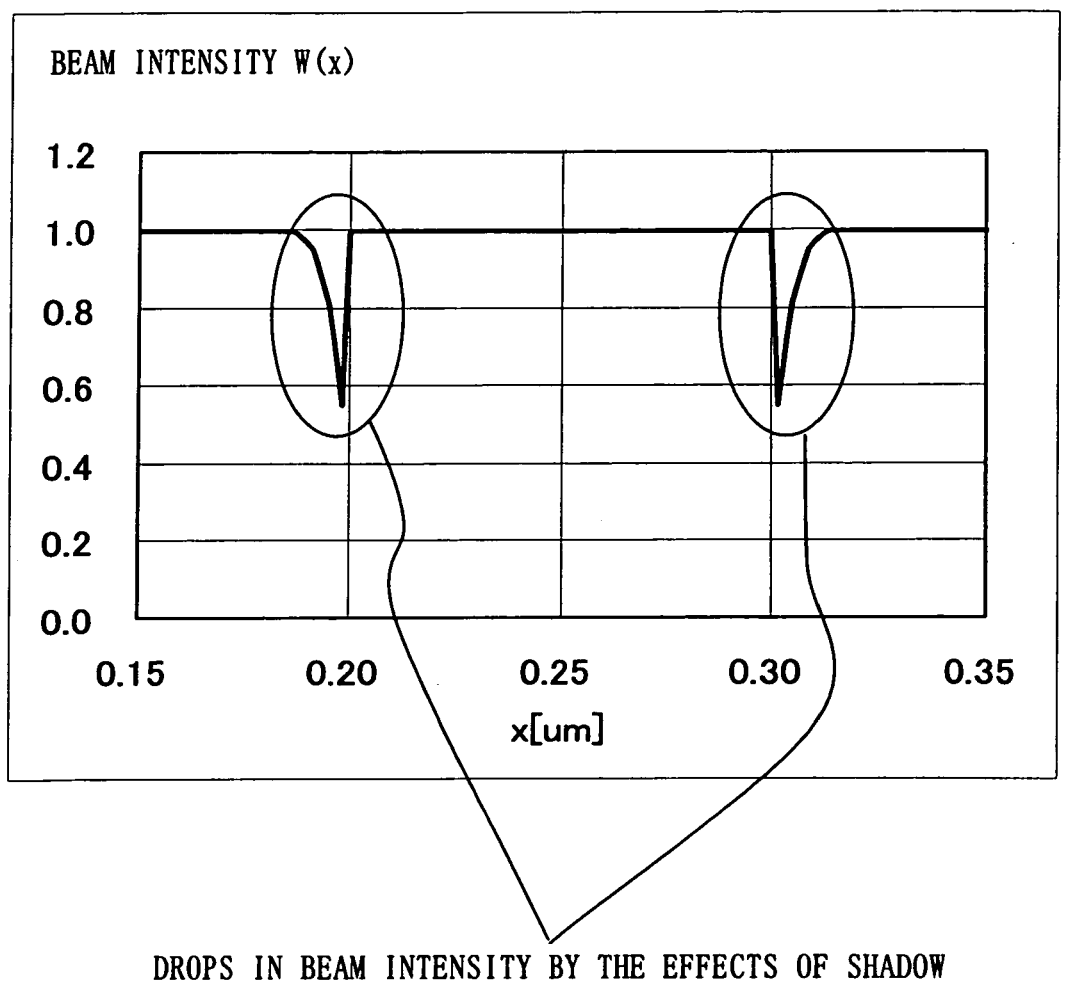
FIG. 8 is a diagram illustrating results of the computation of beam intensity according to the first embodiment.

In S120, the beam intensity computing section 131 reads the aforementioned beam dispersion approximate function that is stored in the beam dispersion approximate function storage section 121 and the computation conditions that are stored in the density distribution computation condition storage section 122. The beam intensity computing section 131 computes the beam intensity (an area surface beam intensity) of the "mesh point 5 in the area 1" and the "mesh point 6 in the area 2" on the surface of the implanted area. An intensity computation is performed based on an angular integration within the range of a beam arrival angle. FIG. 7 is a schematic diagram illustrating "expected beam angles". The "expected beam angle", in respect of the mesh point 6 in the area 2, is defined to be an angle α (or β) that is formed by a horizontal and outward straight line at the mesh point and a tangent line to a "point 7 at a corner of the area 1" touching the mesh point. With the angular integration performed within the beam arrival angle in the intensity computation, the angle index is σ/4 and the integration range is [−5σ, 5σ]. According to the first embodiment, due to the effects of the "shadow 3" by the structural cause, as discussed with reference to FIG. 4, the beam arrival angle becomes acute on the surface of the implanted area near a gate end (a side surface of the area 1). Consequently, the beam intensity becomes low (corresponding to a reduction in the amount of ion to be implanted). In other words, in comparison between the beam arrival angle α and the beam arrival angle β in FIG. 7, the beam arrival angle α at a mesh point 6a situated nearer the gate end (the side surface of the area 1) is smaller (more acute) than the beam arrival angle β at a mesh point 6b in the area 2 (α<β). FIG. 8 shows the beam intensity w(x) at the "mesh point 5 in the area 1" and the "mesh point 6 in the area 2", which are obtained based on the formula 5 introduced with reference to FIG. 3. In the figure, the horizontal axis indicates the horizontal position of the device surface and the vertical axis indicates the beam intensity. The vertical axis is normalized so that the maximum intensity of a beam becomes 1. A range between 0.2 μm and 0.3 μm on the horizontal axis corresponds to the horizontal width (0.1 μm) of the area 1 shown in FIG. 5. In other words, the range between 0.2 μm and 0.3 μm on the horizontal axis indicates the intensity of a beam at the "mesh point 5 in the area 1". Portions outside the range between 0.2 μm and 0.3 μm on the horizontal axis indicate the intensity of a beam at the "mesh point 6 in the area 2". The positions of 0.2 μm and 0.3 μm on the horizontal axis indicate the gate ends. At each gate end, the beam intensity w(x) is reduced from 1.0 to 0.6 or lower. This shows a phenomenon in which the beam intensity is reduced by the effects of the "shadow" near the gate end as mentioned earlier.

Figure 9:
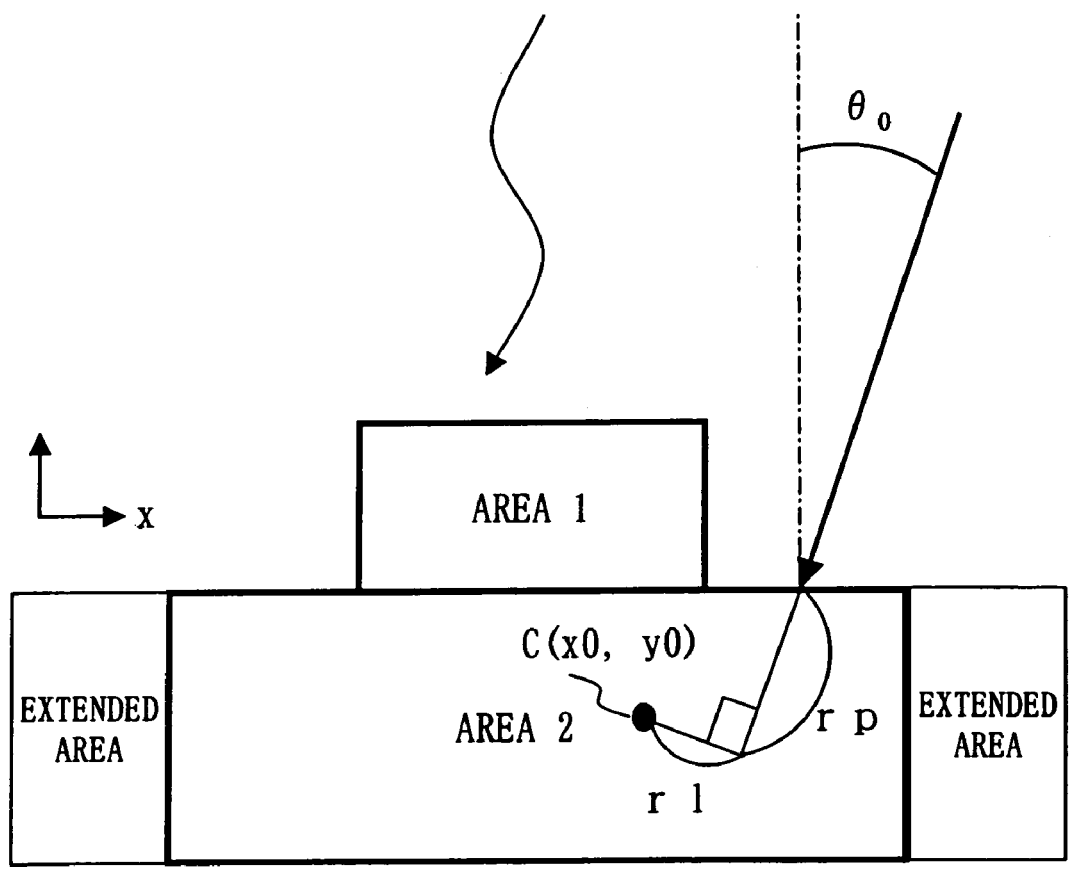
FIG. 9 is a diagram illustrating a computation of ion implantation according to the first embodiment.

In S130, the ion density distribution computing section 132 performs the following computation using respective degrees of the beam intensity obtained at the mesh points 6 in the area 2: After the beam intensity is obtained, the normal computation of ion implantation involving no beam dispersion is performed. By use of the beam intensity, the computation involves the effects of the beam dispersion. FIG. 9 is a diagram illustrating the computation of ion density at an arbitrary point C (xo, yo) in the area 2. With reference to the figure, D, $V(r_p)$, and $H(r_l)$ are the same as those discussed with reference to FIG. 14. The w(x) denotes the beam intensity of FIG. 8. Consequently, a formula 6 in FIG. 9 is a single integral, so that the computation is simpler in compared to that of the formula 3 of the conventional example shown in FIG. 16.

Figure 10:
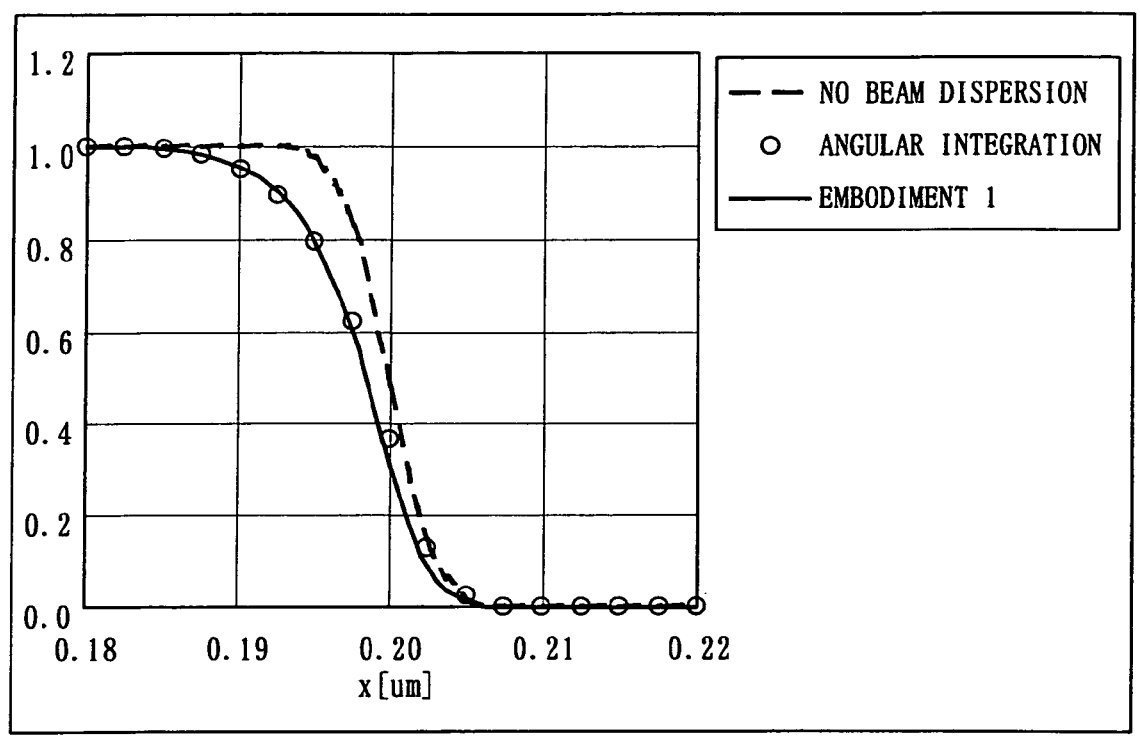
FIG. 10 is a diagram illustrating a horizontal distribution of impurity density in a range from the surface of an area 2 near the gate end down to a surface $100 \times 10^{-10}$ m deep according to the first embodiment.

FIG. 10 shows the results of computations by the ion implantation simulator 100 of this embodiment in a solid line. A dashed line shows results from the conventional computation (FIG. 15) that is performed with disregard to beam dispersion. And, "○" indicates a result from the normal method of computation for an ion implantation simulation (FIG. 16) by using the angular integration with consideration of the beam dispersion. It takes 1.94 seconds to compute in the case of the ion implantation simulator 100 shown by the solid line. It takes 1.59 seconds to compute in the case of the computation disregarding the beam dispersion shown by the dashed line. Thus, according to the ion implantation simulator 100, the time of computing, i.e., 1.94 seconds, with consideration of the effects of the beam dispersion requires a mere 22 percent more than the computing time, i.e., 1.59 seconds, of the conventional case.

For the purpose of checking the accuracy of the computation of the ion implantation simulator 100 of this embodiment, the results of simulation performed by use of the angular integration of the beam dispersion based on the normal method of ion implantation simulation (double integral of FIG. 16) are marked with a "○" in FIG. 10. The marks "○" nearly overlap the solid line. It is assumed in this case that the angle index is σ/4 and the integration range is [−5σ, 5σ] of the angular integration, which is the same as those for the beam intensity computation. It takes 62.9 seconds to compute with the marks "○". Therefore, the speed of computation of the ion implantation simulator 100, i.e., 1.94 seconds, is 30 times or faster than the 62.9 seconds.

As seen in FIG. 10, the computation accuracy of the ion implantation simulator 100 is confirmed high. In addition, the computation time (solid line) of the ion implantation simulator 100 is also confirmed to be 30 times or faster than that by the conventional method of angular integration (marked with the "○"). According to the first embodiment, the two-dimensional simulation is employed for the sake of simplicity. Alternatively, however, it may be extended easily to a three-dimensional simulation. The ion implantation simulator 100 is more effective particularly with the three-dimensional simulation that requires a lot of computing time.

Thus, the ion implantation simulator 100 according to the first embodiment is characterized in that the beam dispersion of an ion beam is indicated by the beam intensity on the surface of the implanted area in the simulation of the density of impurity.

The ion implantation simulator according to the first embodiment implants an ion by an ion beam into a device through a surface of a predetermined area of the device, and simulates a density distribution of the ion in the device. The ion implantation simulator includes the beam dispersion approximate function storage section 121, which stores a beam dispersion approximate function that is obtained through approximation of ion beam dispersion that indicates a divergence of the ion beam by using a predetermined function; a beam intensity computing section 121, which computes an area surface beam intensity that indicates an intensity of the ion beam on a surface of the implanted area that indicates the surface of the predetermined area into which the ion is implanted by the ion beam by using the beam dispersion approximate function that is stored in the beam dispersion approximate function storage section 131; and an ion density distribution computing section 132, which computes the density distribution of the ion, which is implanted by the ion beam into the device through the surface of the implanted area, by using the area surface beam intensity that is computed by the beam intensity computing section. This allows obtaining results of computations with high accuracy with consideration of ion beam dispersion. In addition, the highly accurate results of computations can be achieved at high speed.

The beam dispersion approximate function storage section 121 stores the beam dispersion approximate function that is obtained through approximation by using the Gauss distribution function as a given function. This allows an easy simulation by use of a general purpose function.

The beam intensity computing section 131 computes the beam intensity on the area surface by use of the angular integration. This allows an easy computation of the beam intensity.

The beam dispersion causes the "shadow" due to the structure of the implantation area. The ion implantation simulator 100 indicates the effects of the "shadow" by the beam intensity on the surface of the implantation area. This involves the angular integration of the implantation angle. However, since the dimension of the surface of the implantation area is lower than that of the implantation area, there is no problem with the computing time of the beam intensity. The normal computation of ion implantation involving no beam dispersion follows thereafter by use of the beam intensity at each point on the surface. Hence, a higher speed computation may be achieved compared to the conventional method of simulation that involves the angular integration of the implantation angle.

Embodiment 2

A description will now be given of a second embodiment of the present invention with reference to FIG. 11 and FIG. 12. In the second embodiment, the operation of the ion implantation simulator 100 of the first embodiment is embodied in a method, a program and a medium in which the program has been stored.

With reference to the first embodiment, the operations of the respective elements of the ion implantation simulator 100 are correlated with one another, and therefore may be replaced by a series of operations based on the aforementioned correlation of the respective operations. This will replace the first embodiment with an embodiment of a method.

FIG. 11 is a flow chart illustrating a series of operations including the operation of the beam dispersion approximate function storage section 121, the operation of the beam intensity computing section 131, and the operation of the ion density distribution computing sanction 132 of the ion implantation simulator 100 of the first embodiment, which are represented in the form of an embodiment of a method.

A step S200 indicates a process of storing the beam dispersion approximate function that is obtained through approximation of ion beam dispersion, which indicates an ion beam divergence, by using a given function. A step S210 indicates a process of computing, based on the beam dispersion approximate function, the area surface beam intensity that indicates the intensity of an ion beam on the surface of the implanted area, which is the surface of a given area into which an ion is implanted by an ion beam. A step S220 indicates a process of computing the density distribution of an ion that is implanted into a device by an ion beam through the surface of the implanted area by using the area surface beam intensity computed.

Furthermore, by replacing the operations of the respective elements with the processes of the respective elements, the first embodiment will become an embodiment of a program. More specifically, by replacing the processes of S200 through S220 of FIG. 11 with instructions, the embodiment of a method will become an embodiment of a program for ion implantation simulation. Still further, by storing the ion implantation simulation program in a computer readable storage medium, the embodiment of a program will become an embodiment of a computer readable storage medium having stored therein the program.

It is fully possible that the embodiment of a program and the embodiment of a computer readable storage medium having stored therein the program are configured by a program that can be operated by a computer.

FIG. 12 is a block diagram of a computer system 200 according to the second embodiment in which the operation of the ion implantation simulator 100 of the first embodiment is executed by a program.

A CPU 210 is connected via a bus 211 to a magnetic storage device 220, a monitor 231, a keyboard 232, a mouse 233, a communicating section 234, a printer output section 235, a RAM 246, a ROM 241, an external device connecting section 242, etc. The magnetic storage device 220 stores an operating system (OS) 221, a program group 222, and a data group 223. The printer output section 235 is connected to a printer 236.

The program group 222 is executed by the CPU 210 and the OS 221. The eternal device connecting section 242 is connected to an optical disk drive 243. An optical disk 244 that stores the ion implantation simulation program (an example of the computer readable storage medium having stored therein the program) or an optical disk 245 for data that stores data required for the ion implantation simulation program may be set in the optical disk drive 243 and stored in the magnetic storage device 220. Alternatively, it is also possible to receive the ion implantation simulation program from the communicating section 234 via a network (not shown) and stored the ion implantation simulation program in the program group 222.

A description will now given of the correspondence of the ion implantation simulator 100 of FIG. 1 to the computer system 200 of FIG. 12.

The input section 110 of the ion implantation simulator 100 corresponds to such as the keyboard 232, the mouse 233, the optical disk drive 243, and the communicating section 234 of the computer system 200.

The storage section 120 of the ion implantation simulator 100 corresponds to such as the magnetic storage device 220, the ROM 241 and the RAM 246.

The operations of the computing section 130, the beam intensity computing section 131, and the ion density distribution computing section 132 of the ion implantation simulator 100 are executed by the ion implantation simulation program. The ion implantation simulation program is stored in the program group 222 in the magnetic storage device 220 in the computer system 200. This ion implantation simulation program is read from the optical disk 244. Or, it is read from the communicating section 234 via the network. Or, it is stored in advance in the magnetic storage device 220. Or, it is stored in advance in the ROM 241.

The output section 40 of the ion implantation simulator 100 corresponds to such as the monitor 231, the printer output section 235, and the printer 235.

The instructions of the embodiment of the program and the embodiment of the computer readable storage medium having stored therein the program are executed by the program. The program is stored in the magnetic storage device 220. The instructions are read by the CPU 210 from the magnetic storage device 220. The respective instructions of the ion implantation simulation program are executed by the CPU 210.

Alternatively, it is also possible to execute software or the program by firmware that is stored in the ROM 241. Still alternatively, the ion implantation simulation program may also be implemented by a combination of software, firmware and hardware.

Thus, the computer system 200 of the second embodiment performs the simulation of the density distribution of ion implantation by the ion implantation simulation program. This allows eliminating the necessity of a special dedicated device, so that the ion implantation simulation may be performed by using a general-purpose computer system.

The computer readable storage medium according to the second embodiment stores the ion implantation simulation program, which allows incorporating the program into any other computer system with ease. In addition, the program can be stored and managed with ease.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An ion implantation simulation apparatus that implants an ion by an ion beam into a device through a surface of a predetermined area of the device, and simulates a density distribution of the ion in the device, the ion implantation simulation apparatus comprising:
   a beam dispersion approximate function storage section that stores a beam dispersion approximate function that is obtained through approximation of ion beam dispersion that indicates a divergence of the ion beam by using a predetermined function;
   a beam intensity computing section that computes an area surface beam intensity that indicates an intensity of the ion beam on a surface of an implanted area that indicates the surface of the predetermined area into which the ion is implanted by the ion beam by using the beam dispersion approximate function that is stored in the beam dispersion approximate function storage section; and
   an ion density distribution computing section that computes the density distribution of the ion, which is implanted by the ion beam into the device through the surface of the implanted area, by using the area surface beam intensity that is computed by the beam intensity computing section.

2. The ion implantation simulation apparatus according to claim 1, wherein the beam dispersion approximate function storage section stores the beam dispersion approximate function that is obtained through approximation of the ion beam dispersion by using a Gauss distribution function as the predetermined function.

3. The ion implantation simulation apparatus according to claim 1 or 2, wherein the beam intensity computing section computes the area surface beam intensity by using an angular integration.

4. A method for ion implantation simulation for implanting an ion by an ion beam into a device through a surface of a predetermined area of the device, and simulating a density distribution of the ion in the device, the method comprising:
   storing a beam dispersion approximate function that is obtained through approximation of ion beam dispersion that indicates a divergence of the ion beam by using a predetermined function;
   computing an area surface beam intensity that indicates an intensity of the ion beam on a surface of an implanted area that indicates the surface of the predetermined area into which the ion is implanted by the ion beam based on the beam dispersion approximate function that is stored in the beam dispersion approximate function storage section; and
   computing the density distribution of the ion, which is implanted by the ion beam into the device through the surface of the implanted area, by using the area surface beam intensity that is computed by the beam intensity computing section.

5. A program for ion implantation simulation for causing a computer to execute processes of implanting an ion by an ion beam into a device through a surface of a predetermined area of the device, and simulating a density distribution of the ion in the device, the program comprising the processes of:
   storing a beam dispersion approximate function that is obtained through approximation of ion beam dispersion that indicates a divergence of the ion beam by using a predetermined function;
   computing an area surface beam intensity that indicates an intensity of the ion beam on a surface of an implanted area that indicates the surface of the predetermined area into which the ion is implanted by the ion beam based on the beam dispersion approximate function that is stored in the beam dispersion approximate function storage section; and
   computing the density distribution of the ion, which is implanted by the ion beam into the device through the surface of the implanted area, by using the area surface beam intensity that is computed by the beam intensity computing section.

6. A computer readable storage medium having a program for ion implantation simulation, wherein the program causes a computer to execute processes of implanting an ion by an ion beam into a device through a surface of a predetermined area of the device, and a simulating a density distribution of the ion in the device, the program comprising the processes of:

storing a beam dispersion approximate function that is obtained through approximation of ion beam dispersion that indicates a divergence of the ion beam by using a predetermined function;

computing an area surface beam intensity that indicates an intensity of the ion beam on a surface of an implanted area that indicates the surface of the predetermined area into which the ion is implanted by the ion beam based on the beam dispersion approximate function that is stored in the beam dispersion approximate function storage section; and computing the density distribution of the ion, which is implanted by the ion beam into the device through the surface of the implanted area, by using the area surface beam intensity that is computed by the beam intensity computing section.

* * * * *